US005269858A

United States Patent [19]

Silverman

[11] Patent Number: 5,269,858

[45] Date of Patent: Dec. 14, 1993

[54] METHOD OF SIMULATING STAINED GLASS ART AND PRODUCT THEREOF

[75] Inventor: Gary S. Silverman, Racine, Wis.

[73] Assignee: Western Publishing Company, Inc., Racine, Wis.

[21] Appl. No.: 743,528

[22] Filed: Aug. 9, 1991

[51] Int. Cl.[5] .......... B32B 3/00

[52] U.S. Cl. .......... 156/62; 156/63; 156/247; 156/231

[58] Field of Search .......... 156/63, 231, 62

[56] References Cited

U.S. PATENT DOCUMENTS 4,342,611 8/1982 Tuttle .......... 156/63

FOREIGN PATENT DOCUMENTS 0028971 9/1975 Japan .......... 156/247
0116408 9/1979 Japan .......... 156/247

*Primary Examiner*—David A. Simmons
*Assistant Examiner*—Mark DeSimone
*Attorney, Agent, or Firm*—Amster, Rothstein & Ebenstein

[57] ABSTRACT

A method of simulating stained glass art includes the steps of providing a first substrate having an easy release upper surface and applying to such upper surface a pattern of viscous leading paint. A covering of coloring paint is then applied to at least one area of such upper surface peripherally defined by the leading paint pattern, the coloring paint covering fully extending over the area and contacting the leading paint pattern. The pattern of leading paint and the covering of coloring paint is then removed as an integral, flexible, self-sustaining unit, and the removed unit is finally applied to a second substrate.

13 Claims, 2 Drawing Sheets

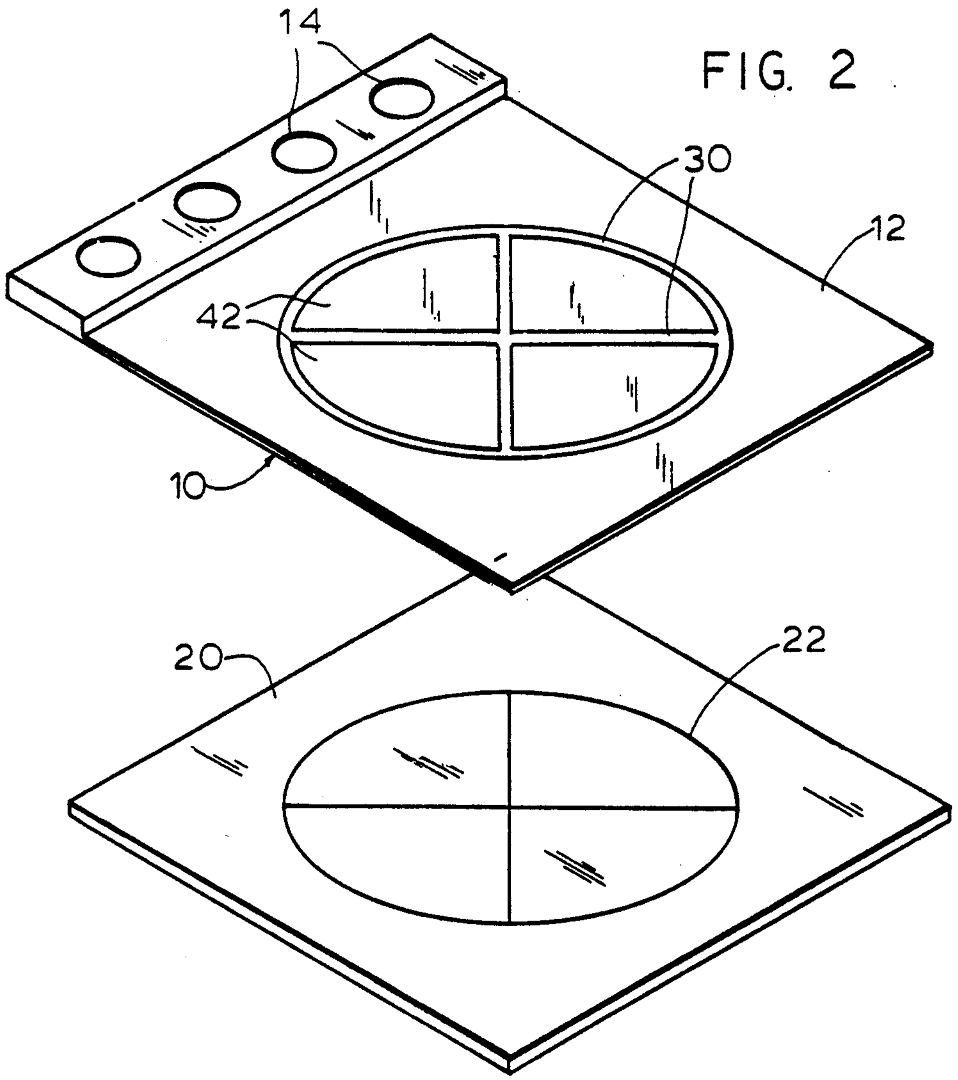
FIG. 2
FIG. 6
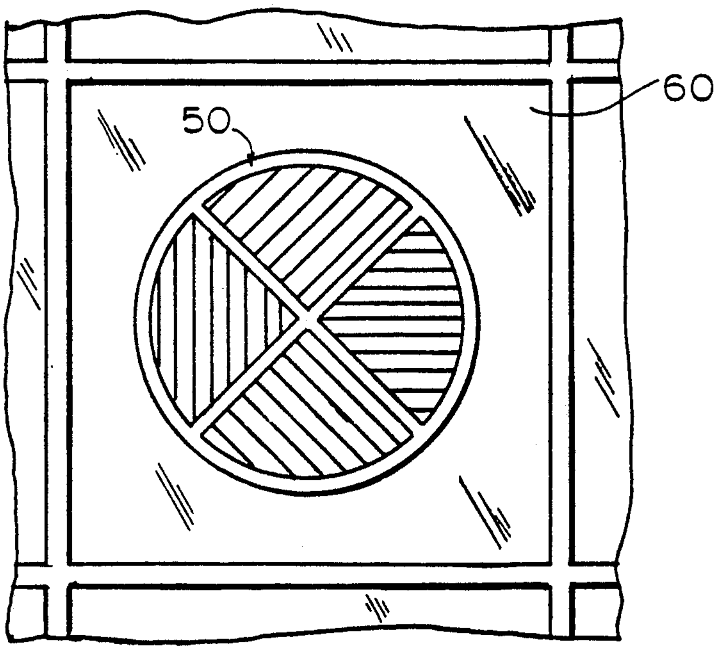

METHOD OF SIMULATING STAINED GLASS ART AND PRODUCT THEREOF

BACKGROUND OF THE INVENTION

The present invention relates to a method of simulating stained glass art and the product thereof.

The textures and effects exhibited by stained glass are appealing, but making stained glass is labor intensive and requires great skill. Thus, even the smallest stained glass pieces are relatively expensive. In order to overcome the high cost involved, several methods and processes have been proposed to simulate stained glass. Generally, however, these methods have not met wide acceptance because either the products do not look real or the methods are too cumbersome to use, or both.

For example, many of the processes used to simulate stained glass art require that the simulated leading, the simulated colored (translucent) glass, or both be pre-formed solids—e.g., cut from a sheet of plastic. The necessity of using pre-formed pieces limits the artistic creativity of the creator since it is clearly more difficult to create intricate, fluid curves by cutting than, say, by painting. Even where the creator is merely attempting to copy a pre-existing design, it is much more difficult for a layman to cut out a design than it is for him to simply trace the design. The problem is, of course, especially exacerbated where the simulated leading and simulated colored (translucent) material must both be pre-formed solids, as in this instance the pre-formed components must eventually closely fit together.

Additionally, where the stained glass art is to replace an existing functional structure, such as a window, the simulated stained glass art must be able to duplicate the desired functional aspects of the window in terms of providing thermal insulation, physical strength, waterproofing, and the like. Even where the stained glass art is not intended to replace an existing structure, it may be physically difficult to construct the stained glass art in the orientation in which it is ultimately desired—for example, on a ceiling window.

Accordingly, it is an object of the present invention to provide a method of simulating stained glass art which does not require the use of any pre-formed solid components, and which provides the creator with the flexibility of working with liquid materials.

Another object is to provide such a method which enables a pre-existing design to be easily traced and reproduced in the simulated stained glass art.

A further object is to provide such a method which does not require the creator to concern himself with the need for the stained glass art to provide the functional qualities of the glass.

It is another object of the present invention to provide such a method which enables the stained glass art to be created in one location and orientation and be easily transferred to another location and orientation.

It is a final object to provide a simulated stained glass product made by such a method.

SUMMARY OF THE INVENTION

It has now been found that the above and related objects of the present invention are obtained in a method of simulating stained glass art comprising the steps of providing a first substrate having an easy release upper surface and applying a pattern of a viscous leading paint to the first substrate upper surface. Next, a covering of coloring paint is applied to at least one area of the first substrate upper surface having a periphery defined by the leading paint pattern, the coloring paint covering fully extending over the one area and contacting the leading pattern. Then the pattern of leading paint and the covering of coloring paint is removed from the first substrate upper surface as an integral flexible self-sustaining film unit. Finally, the removed unit is applied to a second substrate.

In a preferred embodiment, the first substrate is transparent—e.g., polyethylene, polypropylene, or K-resin—and placed over a surface containing a design to be simulated, the pattern of leading paint being applied to the first substrate upper surface by tracing thereon the design to be simulated. The leading paint preferably has a Brookfield viscosity of at least 5200 centipoise when applied. The pattern of leading paint is dried prior to application of the covering of coloring paint. Typically, there is applied to any one area of the first substrate upper surface having a periphery defined by the leading paint pattern a covering of only a single coloring paint. The covering of coloring paint is dried prior to removal of the unit from the first substrate upper surface. The unit is removed from the first substrate upper surface by first peeling therefrom a peripheral portion of the unit and then working towards the center thereof. The second substrate is typically, but not necessarily, light-transmitting.

Preferably, the coloring paint covering is light-transmitting when dried, and the leading paint pattern is opaque when dried.

The invention further encompasses a simulated stained glass product comprising an integral, flexible, self-sustaining film including a pattern of dried leading paint and a covering of dried coloring paint disposed in at least one area peripherally defined by the leading paint pattern, the coloring paint covering fully extending over the area and contacting the leading paint pattern.

BRIEF DESCRIPTION OF THE DRAWING

The above and related objects, features and advantages of the present invention will be more easily understood by reference to the following detailed description of the presently preferred, albeit illustrative, embodiments of the present invention when taken in conjunction with the accompanying drawing wherein:

FIG. 2 is an exploded isometric view thereof, after the design has been copied onto the first substrate using leading paint;

FIG. 6 is a front elevational view of the removed unit applied to a transparent second substrate.

DETAILED DESCRIPTION OF THE PREFERRED EMBODIMENTS

Figure 1:
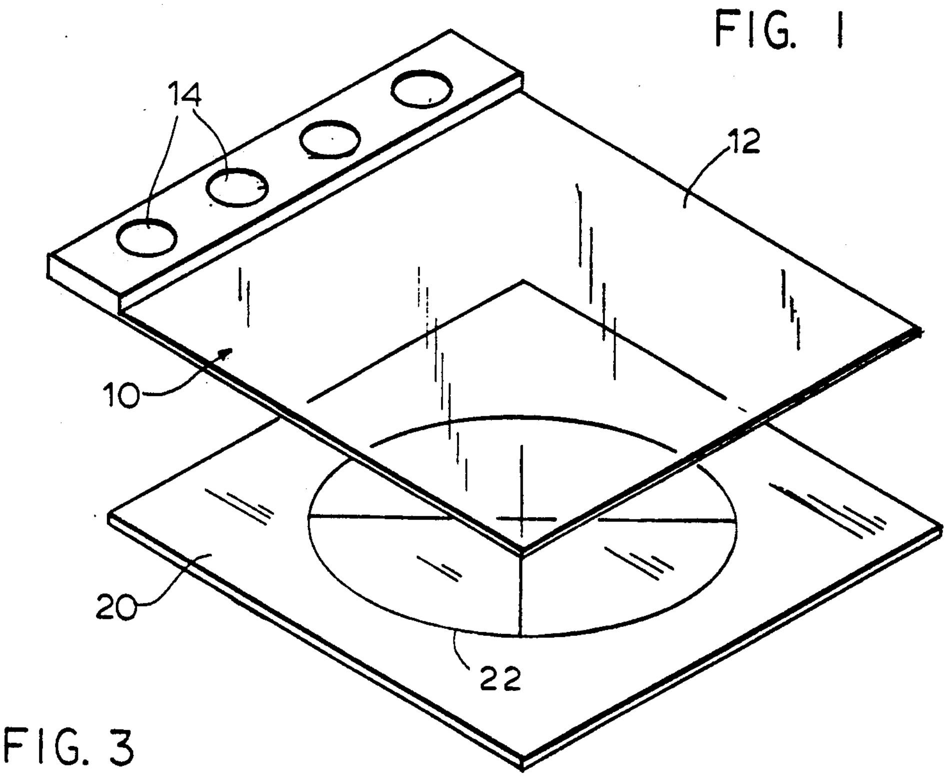
FIG. 1 is an exploded isometric view of a transparent first substrate disposed on a portion of the design to be copied.

Referring now to the drawing, and in particular to FIG. 1 thereof, therein illustrated is a substrate generally designated 10 according to the present invention having a large transparent area 12, and optionally a plurality of mixing wells 14. The substrate 10 is preferably substantially planar with the transparent area 12 having flat upper and lower surfaces (excluding, of course, the mixing wells 14, which may simply be depressions in the upper surface of the substrate 10). The substrate 10 is placed over an article 20 containing a design 22 (here illustrated as a quartered pie or rosette) to be copied. The transparent portion 12 of the substrate 10 is placed over the design 22 so that the design 22 is visible on the upper surface of the substrate 10 thereof, thereby to facilitate tracing of the design 22 thereon. It will be appreciated, however, that where the stained glass art is to be an original work of art rather than a copy of a pre-existing design, the substrate 10 may be transparent, translucent or opaque since no tracing will be involved. Preferred transparent materials for the substrate are polyethylene, polypropylene, and K-resin, the latter being a styrene/butadiene copolymer.

Referring now to FIG. 2 in particular, regardless of whether the work of art is to be an original or a tracing, a pattern of leading paint 30 is applied to the upper surface of substrate 10 in order to simulate the leaded portions of the stained glass work. Typically the leading paint pattern peripherally defines each area which is to be colored differently in the final product. A variety of liquid leading paints may be employed for this purpose, a preferred paint being 0.40 parts by wt. Black No. 10-6C-41-L 700 tinting black from Hilton Davis in 3.54 parts of water and 96.06 parts of peel-off coating No. 32457 from Prime Coatings, a division of Prime Leather Finishes Co. of Milwaukee, WI. The leading paint 30 is flexible and opaque when dry. It is preferably black when dry to simulate leading, but may alternatively be opaque and of a different color in order to produce novel effects. The leading paint 30 preferably has a Brookfield viscosity of at least 5200 centipoises (cps) to ensure that it forms a slightly raised ridge on the upper surface of the substrate 10 when applied thereto (see FIG. 5).

The leading paint 30 may be applied directly from a tube or a bottle, the tube or bottle preferably being provided with an appropriately configured dispensing spout or nozzle—e.g., in the shape of a truncated cone. Alternatively, the leading paint 30 may be applied by a palette knife or artist's paint brush. Despite the relatively high viscosity of the leading paint, it remains a fluid prior to drying and thus can be used to easily and accurately trace the rosette pattern 22 to be copied or deployed freehand to create intricate curvilinear patterns (or other patterns, as desired).

After application of the leading paint 30, the leading paint 30 is allowed to dry, preferably at least until it is dry to the touch. Depending upon the precise type of paint employed as the leading paint, adequate drying may be achieved in 2 to 3 hours at room temperature and even faster where moderate heat is applied to accelerate drying. (Caution must be exercised to ensure that the heating does not deleteriously affect the leading paint, which may be inflammable when wet.)

Figure 3:
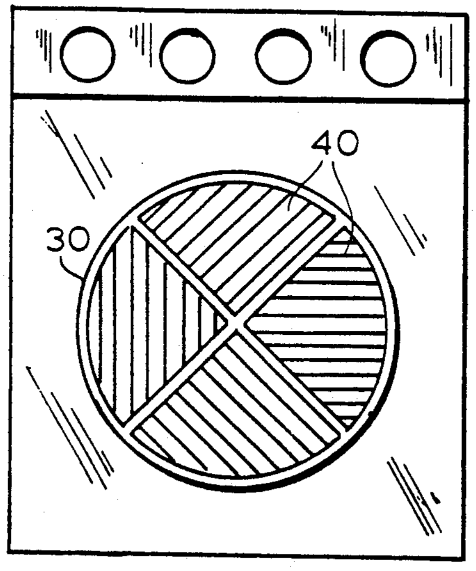
FIG. 3 is a top plan view of the first substrate and leading paint after they have been removed from the design to be copied and after coloring paint has been applied to the areas defined by the leading paint.

Referring now to FIG. 3, after the leading paint 30 has dried sufficiently so that it will not mix or blend with the coloring paint 40, the coloring paint 40 is applied as a covering over the areas 42 which are peripherally defined by the pattern of the leading paint 30. A coloring paint 40 of a single color may be applied within a given area 42 or a plurality of coloring paints 40 of different colors may be applied within a given area 42. If desired, a plurality of coloring paints 40 may be premixed in a mixing well 14 prior to use. A variety of liquid coloring paints 40 may be employed for this purpose. The coloring paints 40 are flexible (to facilitate peeling), non-shrinking (so they don't separate from the leading paint upon drying), tacky when dry (to permit reapplication to a second substrate after removal from the first substrate) and preferably translucent when dry (so that light is transmitted therethrough and colored thereby). A plurality of coloring paints 40, each of a different color, is preferably provided for use.

The preferred leading and coloring paints contain a peel-off coating such as that available under the designation No. 32457 from Prime Coatings, a division of Prime Leather Finishes Co. of Pewaukee, WI. This peel-off coating consists of the following ingredients:

| COMPONENTS | PARTS BY WEIGHT |
|---|---|
| Vinyl-Acrylic Copolymer Latex Emulsion | 45-60 |
| Rheology Modifier | 2-8 |
| Defoamer (mixture of petroleum derivative and other additives) | 0.4-2.0 |
| pH Control Agent (mixture of alkanol amines) | 0.4-2.0 |
| U.V. Light Stabilizer (hindered benzotriazole) | 0.2-0.9 |
| Thickening Agent (Acrylic Copolymer Latex Emulsion) | 0.2-0.9 |
| Water | Balance |

The various preferred paints are formed of 95-96% by weight peel-off coating, 3-5% water, and 0-1% coloring agent (0% coloring agent being used for a clear paint, and a low water the black or leading paint).

It is a critical aspect of the present invention that coloring paint 40 cover each area 42 and make contact with the leading paint 30 defining the boundary of that area 42 so that, when the coloring paint 40 is dry, it forms with the leading paint 30 an integral, flexible, self-sustaining film. To this end, the coloring paint 40 is preferably of a lower viscosity than the leading paint 30 to facilitate its application and its full coverage of the area 42 out to the border or periphery thereof defined by leading paint 30. In view of the lower viscosity of the coloring paint 40 relative to the leading paint 30, the coloring paint 40 may conveniently be applied using a fine artist's paint brush rather than by application directly from the tube or bottle or via a palette knife. The covering of coloring paint 40 is typically thinner than the pattern of leading paint 30 (that is, it does not extend upwardly from the upper surface of the first substrate 10 as high as the leading paint 30) so that the coloring paints 40 in different areas 42 are maintained distinct and separate from each other by the leading paint pattern. Because the coloring paint 40, like the leading paint 30, is a liquid prior to drying, it can be easily and rapidly applied to the desired areas 42—e.g., by pouring or brushing—with the outer edges of the covering of coloring paint 40 flowing to contact the inner edges of the surrounding pattern of leading paint 30.

After application of the coloring paint 40, the coloring paint 40 is allowed to dry thoroughly (and the leading paint 30 is allowed to further dry). Depending upon the particular materials used for the coloring paint 40, overnight drying at room temperature is recommended, although faster drying times may be achieved at moderately elevated temperatures (with the same caveat being applicable as in the accelerated drying of the leading paint 30). The drying period must be sufficient to enable the leading paint 30 and coloring paint 40 to establish themselves as an integral, flexible, self-sustaining unit generally designated 50, for reasons which will become apparent hereinafter.

Figure 4:
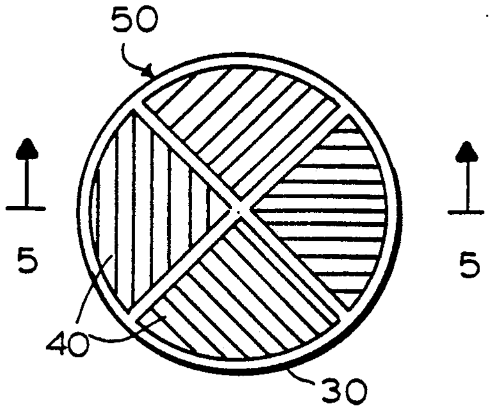
FIG. 4 is a top plan view of the unit comprised of the leading paint pattern and the coloring paint covering removed from the first substrate as an integral, flexible, self-sustaining unit.
Figure 5:
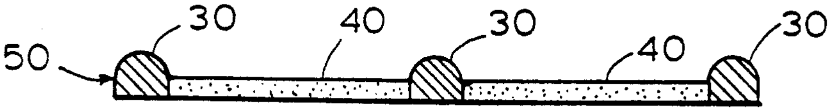
FIG. 5 is a sectional view taken along the line 5—5 of FIG. 4.

Referring now to FIGS. 4 and 5 in particular, after drying of the coloring paint 40, the unit 50 is removed from the upper surface of the first substrate 10. While a variety of different techniques may be employed to effect removal of the unit 50 from the substrate 10, preferably the unit 50 is lifted from the various corners thereof, with the removal proceeding inwardly towards the center of the unit. Depending upon the efficacy of the high release upper surface of the first substrate 10 and the composition and thickness of the paints 30, 40 forming the unit 50, removal may be effected using simply a fingernail or a flat instrument (such as a paint scraper) which facilitates gentle removal of the unit 50 without tearing thereof and preferably without damaging the upper surface of the substrate 10 so that the latter may be reused.

Referring now to FIG. 6 in particular, once the unit 50 has been removed from the first substrate 10, it is gently and carefully transported and applied to a second substrate 60. Naturally, at least a minimal amount of care should be exercised during the process of relocating the unit 50 from the first substrate 10 to the second substrate 60 in order to prevent its tearing or folding in upon itself. Depending upon the composition of the unit 50 and the surface of the second substrate 60 to which it is applied, the unit 50 may adhere simply by virtue of its own nature to a slick substrate 60. On the other hand, where the dry paints 30, 40 are not particularly clinging or the surface texture of the second substrate 60 is not conducive to sticking, a glue or adhesive, which is preferably transparent when dry, may be used to secure the unit 50 to the second substrate 60.

In order to simulate stained glass, the second substrate 60 should be light-transmitting, preferably transparent. However, where an exact simulation of stained glass is not required, the substrate 60 may be non-light-transmitting. Thus, the unit 50 may be applied to a wide variety of second substrates 60 in order to produce interesting effects simulating to varying degrees stained glass works of art.

Additives such as glitter, pearlescence, luminescence, or other light-reflecting or -defracting characteristics can be added to the paints 30, 40 for special effects. The final product may be a window or mirror decoration for use in the home, business or car. As a window decoration it may be used to screen the windows from sunlight or make them translucent or opaque (where the coloring paint is opaque when dry). The finished product may also serve as a message device for the advertisement of sales, business signs, and the like for businesses, trucks, cars, etc. If desired, the finished product may define words or pictures. While, as previously noted, the second substrate is preferably transparent so as to produce a stained glass effect as light shines through the translucent coloring paint, the second substrate may also be opaque, with the finished product being used as an identity sticker for sports helmets, vehicle decorations, holiday decorations, and the like. It is possible to select leading and coloring paints which will not melt or burn at temperatures of 160° F. so that the finished product can be applied directly to light fixtures to reflect colors, patterns and the like.

It will be appreciated that the procedure of the present invention is so easy and simple as to lend itself to home use by the layman with only a minimum being required in the line of tools. Accordingly, a kit may be made available containing the first substrate, a selection of coloring and leading paints, and perhaps a scraper tool or paint brush so that the layman purchaser is conveniently provided with all of the equipment necessary to practice the method and create the product of the present invention at minimum cost and with minimum effort relative to genuine stained glass art.

Even where the simulated stained glass work is to take the form of a window, the unit 50 need not possess the functional properties of a window pane since it would be applied to a pre-existing window pane (as a transparent second substrate) which presumably possesses such functionalities. Because the simulated stained glass work is created from a variety of different liquids, without the use of any pre-formed components, the artist is afforded a full range of creativity, unlimited by the need to cut pre-formed pieces of plastic or the like. The creator is free to use the present method either to copy a pre-existing design by tracing (in which case the first substrate should be transparent) or to create his own original designs, with his creation (the removed unit) being easily relocated or reoriented to the final desired location and orientation.

The term "self-sustaining" as used herein and in the claims refers to the ability of the film unit to sustain itself as an integral unit apart from any substrate supporting the same, as necessary during relocation of the film unit from the first substrate to the second substrate.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A method of simulating stained glass art comprising the steps of:

(A) providing a first substrate having an easy release upper surface;

(B) applying a pattern of a viscous leading paint to the first substrate upper surface;

(C) applying a covering of coloring paint to at least one area of the first substrate upper surface having a periphery defined by the leading paint pattern, the coloring paint covering fully extending over the one area and contacting the leading paint pattern;

(D) removing from the first substrate upper surface, as an integral, flexible, self-sustaining film unit, the pattern of leading paint and the covering of coloring paint; and (E) applying the removed unit to a second substrate.

2. The method of claim 1 wherein the first substrate is transparent.

3. The method of claim 2 wherein the first substrate is polyethylene, polypropylene, or K-resin.

4. The method of claim 2 including the additional step of placing the first substrate over a surface containing a design to be simulated, the pattern of leading paint being applied to the first substrate upper surface by tracing thereon the design to be simulated.

5. The method of claim 1 wherein the leading paint has a Brookfield viscosity of at least 5200 cps when applied.

6. The method of claim 1 wherein including the step of drying the pattern of leading paint prior to application of the covering of coloring paint.

7. The method of claim 1 wherein there is applied to any one area of the first substrate upper surface having a periphery defined by the leading paint pattern a covering of a single coloring paint.

8. The method of claim 1 including the step of drying the covering of coloring paint prior to removal of the unit from the first substrate upper surface.

9. The method of claim 1 wherein the unit is removed from the first substrate upper surface by first peeling therefrom a peripheral portion of the unit and then working towards the center thereof.

10. The method of claim 1 wherein the second substrate is light-transmitting.

11. The method of claim 1 wherein the coloring paint covering is light-transmitting when dried.

12. The method of claim 1 wherein the leading paint pattern is opaque when dried.

13. A method of simulating stained glass art comprising the steps of:

(A) providing a first transparent substrate having an easy release upper surface;

(B) placing the first substrate over a surface containing a design to be simulated;

(C) applying a pattern of a viscous leading paint having a Brookfield viscosity of at least 5200 cps to the first substrate upper surface by tracing thereon the design to be simulated;

(D) drying the pattern of leading paint, the leading paint pattern being opaque when dried;

(E) applying a covering of coloring paint to at least one area of the first substrate upper surface having a periphery defined by the leading paint pattern, the coloring paint covering fully extending over the one area and contacting the leading paint pattern;

(F) drying the covering of coloring paint, the coloring paint covering being light-transmitting when dried;

(G) removing from the first substrate upper surface, as an integral flexible self-sustaining film unit, the pattern of leading paint and the covering of coloring paint by first peeling therefrom a peripheral portion of the unit and then working towards the center of the unit; and (E) applying the removed unit to a second substrate.

* * * * *